United States Patent [19]

Sveceny

[11] 4,137,555

[45] Jan. 30, 1979

[54] MAGNETIC HEAD

[75] Inventor: Alfred Sveceny, Vienna, Austria

[73] Assignee: U.S. Philips Corporation, New York, N.Y.

[21] Appl. No.: 880,440

[22] Filed: Feb. 23, 1978

Related U.S. Application Data

[63] Continuation of Ser. No. 693,945, Jun. 8, 1976.

[30] Foreign Application Priority Data

Jun. 18, 1975 [AT] Austria ................................. 4675/75

[51] Int. Cl.$^2$ ............................................. G11B 5/10
[52] U.S. Cl. ................................. 360/129; 360/125; 360/121
[58] Field of Search ............................. 360/128–129, 360/125–126, 119, 121

[56] References Cited

U.S. PATENT DOCUMENTS

| 3,763,329 | 10/1973 | Linke | 360/121 |
| 3,978,523 | 8/1976 | Tanaka et al. | 360/121 |

FOREIGN PATENT DOCUMENTS 899564 12/1953 Fed. Rep. of Germany ........... 360/129

Primary Examiner—John H. Wolff
Attorney, Agent, or Firm—David R. Treacy; Robert S. Smith

[57] ABSTRACT

In a magnetic head having a tape contact face, a non-ferromagnetic unitary housing has a cavity for receiving a coil and has a slot for receiving at least one C-core of the magnetic circuit. The slot extends in a side face of the housing and debouches at one end into the cavity and at the other end into the tape contact face.

4 Claims, 4 Drawing Figures

MAGNETIC HEAD

This is a continuation, of application Ser. No. 693,945, filed June 8, 1976.

The invention relates to a magnetic head having a housing of a non-ferromagnetic material and a tape contact face for a record carrier. The housing has apertures which are accessible from the outside and are destined for receiving a coil and ferromagnetic core parts of a magnetic circuit. Such a magnetic head is disclosed in German Patent Specification No. 899,564.

The manufacture of magnetic heads for recording, reproducing and/or erasing signals on a magnetizable record carrier usually occurs in series production and often in large numbers. For a rational manufacture it is therefore of importance that the construction and the assembly of such a magnetic head be as simple as possible consistant with imposed qualitative requirements.

It is therefore an object of the invention to provide a magnetic head which can particularly simply be manufactured in series production. According to the invention, a magnetic head of the kind mentioned in the preamble is characterized in that the housing is formed as one assembly, in which a coil aperture comprises a cavity which debouches into a side of the housing which is located opposite to a tape contact face and an aperture for at least one ferromagnetic core part. The core part is formed as a C-core which consists of a slot extending in a side surface of housing and debouching on the one side into the cavity and on the other side into the tape contact face. The assembly of such a magnetic head is particularly simple because from the outside of the housing which forms one assembly, first the coil can be positioned in the cavity and then the ferromagnetic core parts can be positioned in the slots. After the assembly the housing forms a protection for the coil and other components.

Advantageously, the aperture for an I-shaped ferromagnetic core part to be inserted into the core aperture consists of a channel which perforates the part of the housing between the cavity and the tape contact face. As a result of this, magnetic heads having two-limbed magnetic circuits consisting of a C-core and an I-core and magnetic heads having three-limbed magnetic circuits consisting of two C-cores and one I-core can be manufactured in the simple manner according to the invention.

Of course, as is usual in magnetic heads, a gap must be formed between the ferromagnetic core parts of the magnetic circuit in the region of the tape contact face, which can be done, for example, by the interposition of a separate spacer consisting of a non-ferromagnetic material or of alternate layers of a non-ferromagnetic material and a ferromagnetic material. In order to facilitate the assembly it is efficacious to provide the housing with a further groove for the spacer. Preferably, at least one spacer is former on the part of the housing between the cavity and the tape contact face in the region of the tape contact face, said spacer adjoining at least on one side a slot for a C-core. In fact, no separate processing for the formation of the gap is necessary in this manner.

It has furthermore proved of advantage to have core parts secured in their apertures by means of a flexible adhesive. In this manner it is ensured that also in the case of a possible variation in shape of the housing, for example, by shearing or shrinkage in extreme temperature conditions, the magnetic circuit in itself is not changed as a result of the flexibility of the adhesive and the core parts thereof are not exposed to forces which would have a detrimental effect on the properties of the magnetic head.

With a view to a simple assembly it has proved advantageous when the housing is formed from duroplastic synthetic resin and beside the orifice of the cavity at least two pins serving as supporting points for soldering and about which the wire ends of the coil can be wound from part of the housing. As a result of this, separate supporting points for soldering may be omitted because the duroplastic synthetic resin projections enable the direct soldering of connection wires to the wire ends of the coil.

It has furthermore proved of advantage to provide at least one guide part on the housing for guiding a record carrier. The guide may project over the tape contact face and with this orientation a separate tape guide on the magnetic head is superfluous.

The invention will now be described in greater detail, by way of example, with reference to the drawing which shows two embodiments of the magnetic head according to the invention, to which, however, the invention is not restricted.

Figure 1:
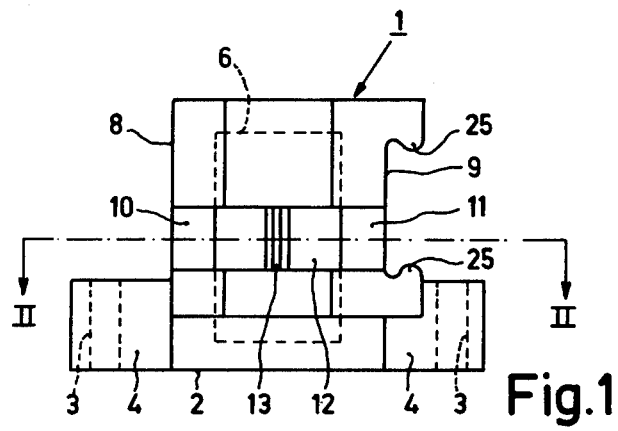
FIG. 1 shows the housing for a magnetic head viewed on top of the tape contact face with the C-cores and coil omitted.
Figure 2:
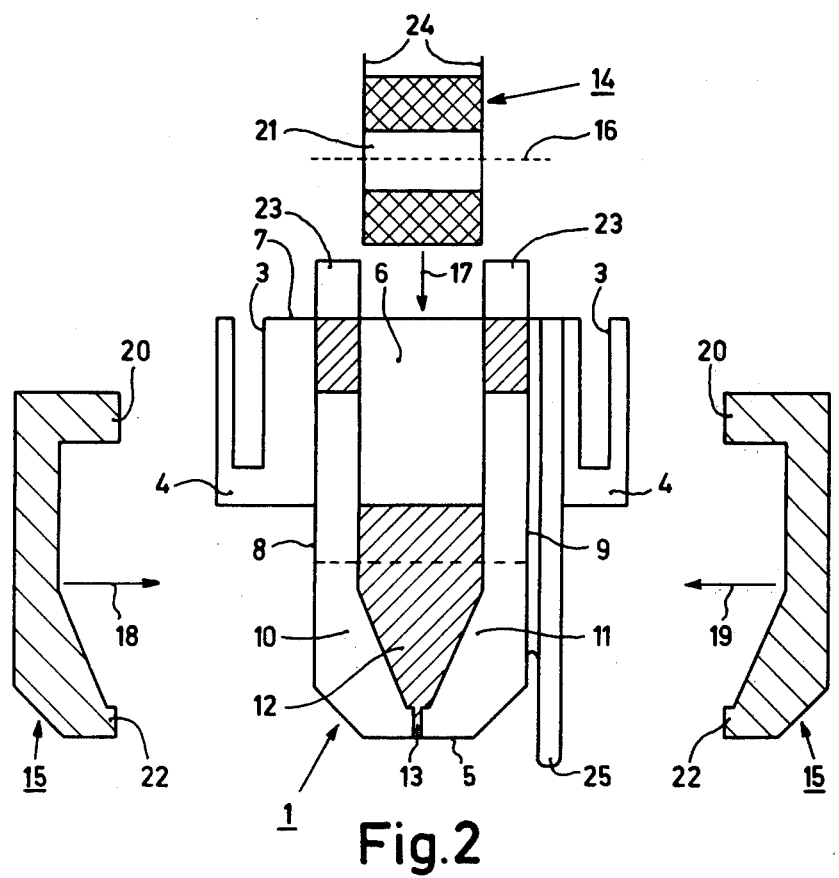
FIG. 2 is a sectional view taken on the line II—II of FIG. 1 with the addition of the coil and the C-cores and all of the elements shown in partially exploded relationship.
Figure 3:
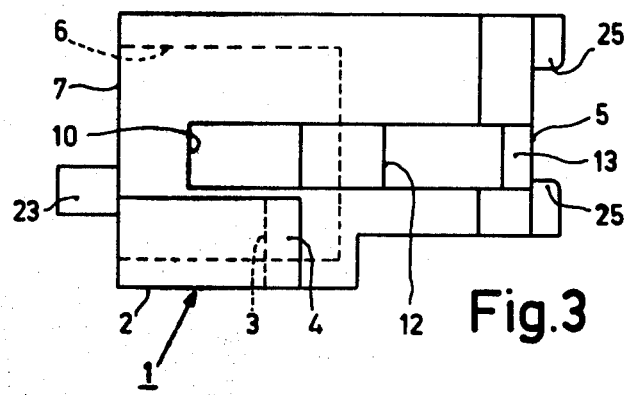
FIG. 3 is a side elevation of the housing shown in FIG. 1 rotated ninety degrees . . . . .

Referring now to FIGS. 1 to 3, there is shown a magnetic head having a housing 1. In this example a single-track erasing head forms a primarily square basic member. The housing 1 has a supporting surface 2 by which the magnetic head can be mounted on a head supporting plate or a head adjusting device of a tape recorder (not shown) by means of screws, which screws can be introduced into slots 3 provided in projections 4 of the housing. The housing 1 furthermore has a tape contact face 5 which is formed by a front face of the housing and which, as is usual, is ground after the assembly of the magnetic head. . .

The housing 1 which forms one assembly has a cavity 6 which debouches into a rear face 7 of the housing disposed opposite the tape contact face 5. Furthermore, slots 10 and 11 debouching on the one hand into the cavity 6 and on the other hand into the tape contact face 5 are provided in side faces 8 and 9 of the housing. Finally, a spacer 13 is formed on a part 12 of the housing between the cavity and the pole face in the region of the tape contact face 5, the slots 10 and 11 adjoining said filling on the side. The cavity 6 serves for receiving, for example, a self-supportingly wound coil 14 and the shapes of the slots 10 and 11 are adapted to receive C-cores 15 for the purpose of forming the ferromagnetic core parts of a magnetic circuit.

The assembly of the magnetic head is performed simply in such manner that the coil 14 is moved in the direction of an arrow 17 into the cavity 6 with the coil axis 16 parallel with respect to the tape contact face, after which a C-core 15 is inserted into each of the slots 10 and 11. For the insertion, the cores are moved in the direction of the arrows 18 and 19, respectively, the ends 20 of the C-cores landing in a coil aperture 21 and the ends 22 of the C-cores about the sides of spacer 13. Pole face 5' in the position of C-core 15 is the disposed proximate to the tape contact face 5. In this manner the magnetic circuit of the magnetic head is formed, the position of the separate parts is fixed, for example, by filling the apertures of the housing with a hardening synthetic resin. Advantageously, however, a flexible adhesive is used for fixing the C-cores in the slots and possibly also the coil in the cavity, so that possible variations in shape of the housing, as they occur especially in a housing manufactured from a synthetic resin, for example, by shrinkage in extreme temperature conditions, do not change the magnetic circuit in itself and cause no pressure load of the core parts. It will be understood that the term "flexible adhesive" refers to an adhesive which retains flexibility in air at ambient temperatures encountered by magnetic heads. In a housing manufactured from a synthetic resin, variations in shape as mentioned above are also resisted if a glass fibre-reinforced synthetic resin is used, so that the housing obtains a great rigidity, which is advantageous inter alia with a view to the stability of the tape contact face.

Two pins 23 project from the rear face 7 of the housing 1 beside the orifice of the cavity 6, about which pins the wire ends 24 of the coil 14 can be wound and which in the case of a housing formed from a duroplastic synthetic resin, can be used immediately as soldering points for soldering connection wires to the wire ends 24. Furthermore, two guide parts 25 are formed on the housing for guiding a record carrier, which parts are present on the side of the track to be followed by said carrier and beyond the tape contact face 5, so that the track of the record carrier is fixed with respect to the gap of the magnetic circuit. If desired, of course, a separate guide part for a record carrier may be provided which advantageously is formed as an insert for assembly in a recess of the housing to be provided for that purpose.

As appears from the above, the housing in itself forms a basic member for the construction of the magnetic head, in which simultaneously also those parts, such as the spacer supporting points for soldered connections and guide parts for a record carrier which normally are still necessary for finishing the magnetic head, may form part of the housing. In the construction of the magnetic head according to the invention a minimum number of separate components is therefore necessary and as a result of this the assembly thereof is a simple and rapid operation.

Figure 4:
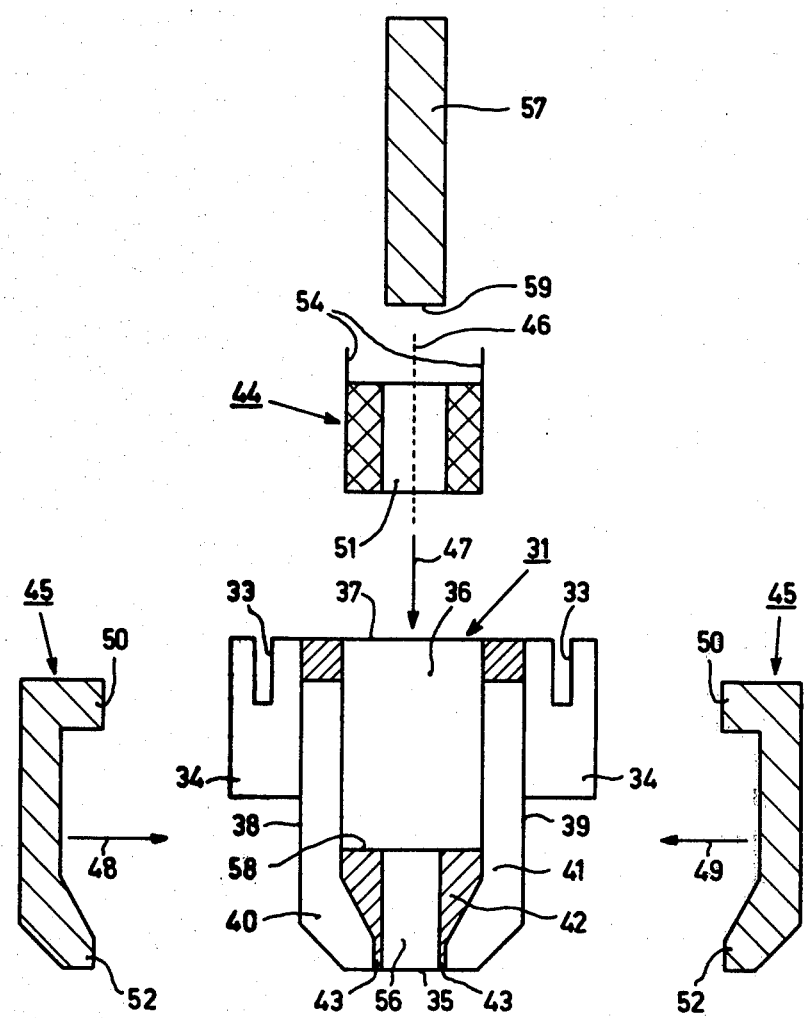
FIG. 4 shows, exploded relation another embodiment of the invention including two C-cores and one I-core.

In the embodiment shown in FIG. 4, a housing 31 comprises, in addition to a cavity 36 and slots 40 and 41, a channel 56 intersecting the housing part between a cavity 36 and a tape contact face 35, in which channel an I-core 57 can be incorporated. Two spacers 43 are formed on a housing part 42 in the region of a tape contact face 35, each of the said spacers being disposed on one side of the channel 56 and adjoining the two slots 40 and 41 respectively.

A coil 44 is provided in the cavity 36 with the coil axis 46 at right angles to the tape contact face 35 down to a bottom face 58 of the cavity so that a coil aperture 51 is disposed in the elongation of the channel 56. The I-core 57 is then moved into the coil aperture and the channel 56 over such a distance that an end face 59 is flush with the tape contact face 35. This position of the I-core may be fixed by an assembly device or by a projection formed in the region of the tape contact face in front of the aperture of the channel 56 on the housing and which is removed upon grinding the tape contact face. Two C-cores 45 are then inserted into the slots 40 and 41, respectively, the ends 50 thereof engaging around the coil 44 and becoming located on either side against the end of the I-core projecting from the coil. The ends 52 of the C-cores are located on the side beside one of the two spacers 43.

In this manner a magnetic head having a three-limb magnetic circuit with a double gap is formed in which the assembly proves to be particularly simple.

It will be obvious that the invention is not restricted to the above-described examples but that many variations are possible to those skilled in the art without departing from the scope of this invention. In this connection it is to be noted especially that with the measures according to the invention multitrack magnetic heads can of course also be constructed, as well as magnetic heads the magnetic circuit of which comprises a C-core and an I-core.

What is claimed is:

1. A magnetic head comprising:
a non-magnetic unitary housing adapted to house a magnetic system, said housing including first and second opposed walls which together enclose a cavity, said cavity having first and second spaced apart faces disposed substantially normal to said first and second walls, said first face being a tape recording medium contact face, said second face being an open rear face, said first and second opposed walls each having over a part of their length a slot, said slots each extending through one said wall and into said recording medium contact face, said housing including an inner wall part centrally disposed between said first and second walls, said inner wall having a length dimension which is less than the length of said slots and having an edge which is flush with said recording medium contact face, said magnetic head including first and second C-shaped core parts disposed in said slots to form a magnetic circuit interrupted by said edge of said inner wall, said C-shaped core parts being dimensioned and configured for mating engagement with said housing, said magnetic head further including a winding disposed in magnetically coupled relationship to said core parts with at least some portion of said winding extending about some portion of said core parts, said cavity proximate to said rear face being dimensioned and configured for mating engagement with said winding, said winding including first and second ends for cooperation with associated apparatus, said housing positioning said core parts and winding in predetermined fixed relationship and further including means holding said winding, said C-shaped core parts and said housing in mating engagement with each other.

2. Apparatus as described in claim 1 further including means for guiding an associated magnetic medium, said means for guiding being part of said housing.

3. A magnetic head comprising:
a non-magnetic unitary housing adapted to house a magnetic system, said housing including first and second opposed walls which together enclose a cavity, said cavity having first and second spaced apart faces disposed substantially normal to said first and second walls, said first face being a tape recording medium contact face, said second face being an open rear face, said first and second opposed walls each having over a part of their length a slot, said slots each extending through one said wall and into said recording medium contact face, said housing including an inner wall part centrally disposed between said first and second walls, said inner wall having a length dimension which is less than the length of said slots and having an edge which is flush with said recording medium contact face, said magnetic head including first and second C-shaped core parts disposed in said slots, said C-shaped core parts being dimensioned and configured for mating engagement with said housing, said magnetic head further including an I-shaped core having a winding disposed thereabout, said I-shaped core being intermediate said C-shaped cores, said C-shaped cores and said I-shaped core forming a magnetic circuit which is interrupted intermediate said I-shaped core parts and each of said C-shaped cores by said inner wall, said cavity being dimensioned and configured for mating engagement with said winding, said winding including first and second ends for cooperation with associated apparatus, said housing positioning said core parts and winding in predetermined fixed relationship and further including means holding said winding, said C-shaped core parts and said I-shaped core in mating engagement to form a composite magnetic head.

4. Apparatus as described in claim 3 further including means for guiding an associated magnetic medium, said means for guiding being part of said housing.

* * * * *